United States Patent [19]

Martinmaas

[11] E Re. 31,140

[45] Reissued Feb. 8, 1983

[54] SOCKET WRENCH WITH INTERCHANGEABLE SOCKETS STORED IN HANDLE

[76] Inventor: Werner W. Martinmaas, 3461 Cashill Blvd., Reno, Nev. 89509

[21] Appl. No.: 284,382

[22] Filed: Jul. 17, 1981

Related U.S. Patent Documents

Reissue of:

[64] Patent No.: 4,253,356
Issued: Mar. 3, 1981
Appl. No.: 73,966
Filed: Sep. 10, 1979

U.S. Applications:

[63] Continuation of Ser. No. 909,103, May 24, 1978, abandoned.

[51] Int. Cl.[3] ..... B25G 1/08

[52] U.S. Cl. ..... 81/177 N; 145/62; 206/378

[58] Field of Search ..... 16/110.5; 81/177 R, 81/177 E, 177 G, 177 M, 177 N, 180 R; 145/61 R, 61 J, 62; 206/375, 378, 559, 560; 220/20, 22

[56] References Cited

U.S. PATENT DOCUMENTS

| | | | |
|---|---|---|---|
| 1,289,558 | 12/1918 | Sedgley | 81/177 N X |
| 1,680,578 | 8/1928 | Wakefield | 206/375 |
| 1,724,491 | 8/1929 | Mandl | 81/177 |
| 1,961,450 | 6/1934 | Petersen | 206/375 |
| 2,301,945 | 11/1942 | Green | 81/124.1 |
| 2,776,589 | 1/1957 | Gregory | 81/177 N |
| 3,745,860 | 7/1973 | Bennett | 81/177 N X |

FOREIGN PATENT DOCUMENTS

| | | | |
|---|---|---|---|
| 1504865 | 3/1978 | United Kingdom | 145/62 |

*Primary Examiner*—James G. Smith
*Attorney, Agent, or Firm*—Wegner, McCord, Wood & Dalton

[57] ABSTRACT

A socket wrench of the type having interchangeable sockets has its handle constructed to provide a cavity which has an entrance opening along one side and compartments in each of which one of the socket members may be received and frictionally gripped. An access opening in the wall operatively associated with each compartment permits application of force to the socket member in the compartment to remove it through the entrance opening.

30 Claims, 8 Drawing Figures

Fig. 1.
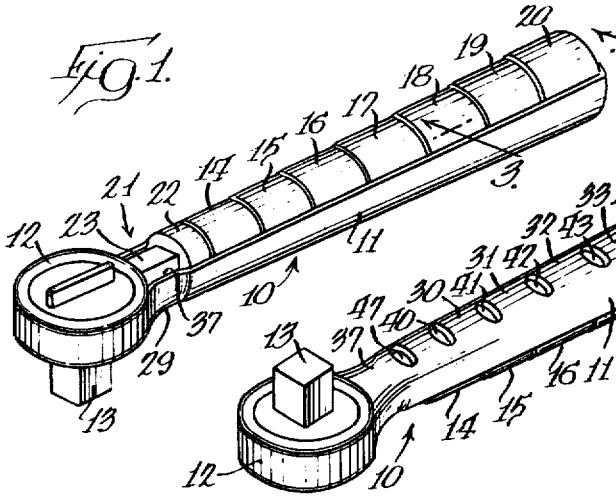
Fig. 2.
Fig. 3.
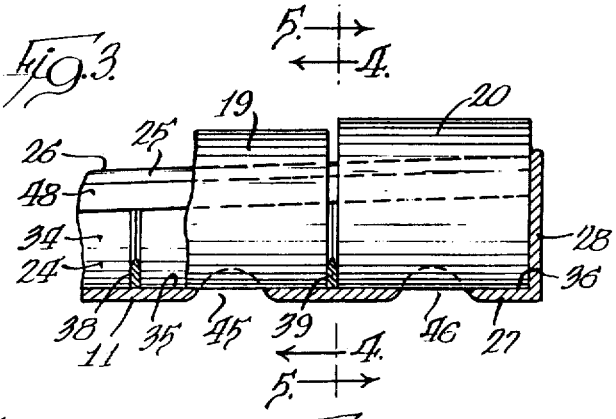
Fig. 4.
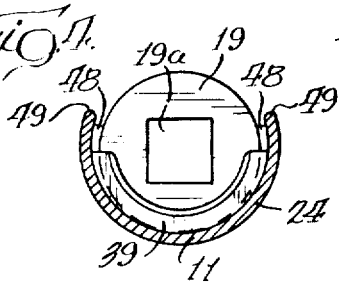
Fig. 5.
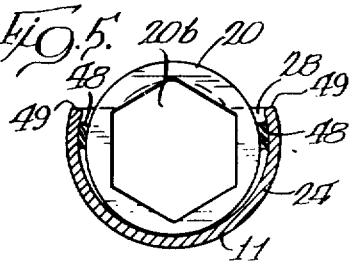

20
19
18
17
16
15
14
21
12
13
7
7
124
146
145
144
143
149
142
141
140
147

19
149
149
148
148
145
145
124

20
20b
19
18
17
16
15
14
21
22
23
224
246
245
244
243
241
242
240
247

SOCKET WRENCH WITH INTERCHANGEABLE SOCKETS STORED IN HANDLE

Matter enclosed in heavy brackets [ ] appears in the original patent but forms no part of this reissue specification; matter printed in italics indicates the additions made by reissue.

This is a continuation of application Ser. No. 909,103, filed May 24, 1978.

BACKGROUND OF THE INVENTION

A very popular and useful wrench is a socket wrench of the type which has a handle, a head at one end of the handle with a socket mounting stub, and a set of interchangeable socket members of different sizes which are adapted for individual selective mounting on the stub. Usually called "socket wrench sets", they are commonly packed in a box which has a compartment for the handle and a compartment, or separate compartments, for the interchangeable socket members. In addition, it is quite common for such a socket wrench set to include an extension member which has one end portion that seats on the stub and a second end portion comprising a stub to selectively receive the interchangeable socket members.

Socket wrench sets are often used in connection with service work on machinery or vehicles; and it is a common experience of a person doing such work to find that he needs to change socket members when the case containing them is not readily at hand; and this causes undesirable delay and, sometimes, frayed nerves.

Many interchangeable socket members are lost because they are not immediately returned to the case; especially when, for example, the person removes from the case two or three socket members that he expects to need on a particular job and then misplaces one or more of them.

SUMMARY OF THE INVENTION

The principal object of the present invention is to provide an improved socket wrench of the type having interchangeable sockets by constructing the wrench handle in the form of an arcuate longitudinal wall defining a cavity which has an entrance opening along one side through which socket members may be inserted into the cavity, said cavity has portions of different sizes each of which is adapted to frictionally grip one of the socket members of said set;

and said wall as an access opening operatively associated with each portion of the cavity permitting application of force to the socket member in said portion to remove it through said entrance opening.

THE DRAWINGS

FIG. 1 is a perspective view of a socket wrench embodying a first form of the invention, shown with the entrance opening to the storage cavity uppermost;

FIG. 2 is a perspective view of the embodiment of FIG. 1 with the entrance opening lowermost;

FIG. 3 is a fragmentary longitudinal sectional view taken substantially as indicated along the line 3—3 of FIG. 1;

FIG. 4 is a sectional view taken on the section line in FIG. 3 looking in the direction of the arrows 4—4;

FIG. 5 is a sectional view taken along the section line in FIG. 3 looking in the direction of the arrows 5—5;

DETAILED DESCRIPTION OF THE INVENTION

Figure 6:
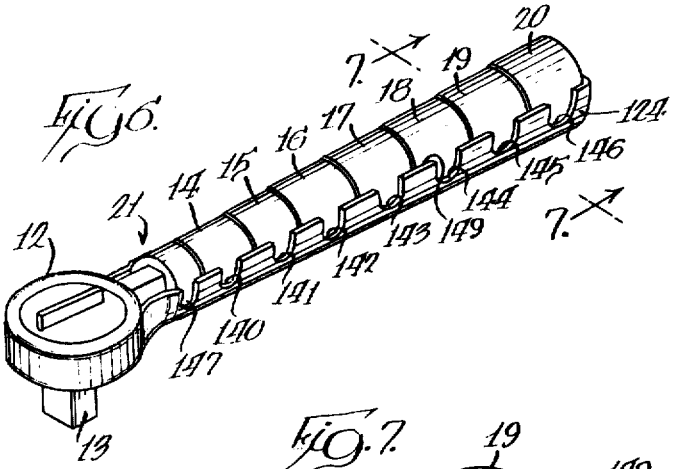
FIG. 6 is a view like FIG. 1 of a second embodiment of the invention.

Referring to the drawings in greater detail, and referring first to FIGS. 1 to 5, a socket wrench, indicated generally at 10, includes a handle 11, a head 12, a set of interchangeable socket members 14 through 20 which are of different sizes and which are adapted to be individually selectively mounted on the stub 13, and an extension member 21 which has one end portion 22 that seats on the stub 13 and a second end portion 23 comprising a stub to selectively receive any of the socket members 14 through 20.

The handle 11 comprises a longitudinal, arcuate wall 24 defining a cavity 25 with an entrance opening 26, and the wall 24 tapers from a board outer end 27, having an end plate 28, to a narrow neck 29 which is immediately adjacent the head 12.

The cavity 25 has a plurality of portions 30 through 36 (FIG. 2) which are adapted to receive and frictionally retain the socket members 14 through 20, respectively. In addition, the cavity 25 includes a neck portion 37 in which the extension member 21 is frictionally held. The portions 30 through 37 of the cavity 25 are defined by transverse webs, such as the webs 38 and 39 in FIGS. 3 and 4, which thus cause the several portions 30 through 37 of the cavity to serve as compartments for the members 14 through 21. The compartment for the socket member 20 is, of course, defined by the web 39 and the end wall 28 of the handle. The webs have chamfered and rounded margins to facilitate insertion of the socket members into the compartments.

Each of the portions, or compartments 30 through 37 is provided with an access opening, numbered 40 to 47, respectively, consisting of a laterally elongated hole which is on the longitudinal median line of the wall 24. Each of the access openings permits pressure to be applied to the member which is frictionally retained in the compartment with which the access opening is associated, so as to remove the member from the compartment through the entrance opening 26. As seen from the enlarged sectional views of the holes 45 and 46 in FIG. 3, the margins of the holes are carefully finished to a rounded cross section so that a person applying finger pressure to remove one of the numbers cannot damage a finger or push it through the hole and find himself unable to withdraw it.

The compartments 30 through 37 are provided with resilient means, which, as illustrated in the drawings, consists of a pair of strips 48 of a soft, elastomeric material which are close to the upper edges 49 of the wall 24 which define the entrance opening 26.

As seen in FIGS. 4 and 5, the longitudinal wall 24 has a radius of curvature in the area of any of the compartments 30 through 37 which is a greater than that of the number stored in the compartment, but the upper margins 49 of the wall 24 are above the pivot axes of the members and curve inwardly above the diameters of said members which are stored in the handle with their pivot axes extending longitudinally. Thus, the wall in cross section is a segment of a circle in excess of 180°, and the resilient means 48 is slightly above a horizontal diameter of each of the members so as to afford firm frictional gripping of all the members, each of which is stored with its diameter inwardly of the minimum span across the resilient means 48. It is clear that the cavity might have a resilient strip on only one side, with the socket member snapping past the margin of the wall on the other side; or that with proper selection of wall material and thickness the socket members could snap into place without the separate resilient means.

The interchangeable socket members 14 through 20 are of standard type. Each has a square hole, like the hole 19a seen in FIG. 4, at one end; and a hexagonal socket, like the socket 20b seen in FIG. 5, at the other end. The square holes adapt the socket members for individual selective mounting on the stub 13 or on the extension member stub 23, as the case may be.

Figure 7:
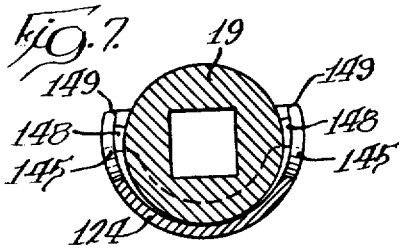
FIG. 7 is a transverse sectional view taken substantially as indicated along the line 7—7 of FIG. 6.

Referring now to FIGS. 6 and 7, the second embodiment of the invention is similar to the first, except that the access openings in the form of holes along the median line of the handle wall 24 are eliminated; and a handle wall 124 is provided with access openings in the form of an arcuate recess at each of the margins 149 of the wall. The recesses are given the reference numerals 140 through 147 in FIGS. 6 and 7, corresponding to the numbers 40 through 47 of the access holes in the first embodiment. As seen in FIG. 7, the arcuate recesses are provided with margins which are rounded in cross section to avoid possible finger injury. The recesses permit force to be applied to a socket member by gripping it between the fingers in order to remove it from the cavity through the entrance opening, as is the case with the first embodiment.

The only difference between the first and second embodiments is that in the latter the arcuate recesses make it necessary for the resilient means to be in the form of single pads 148 bonded to the wall 124 between the recesses, rather than the continuous strips of the first embodiment.

Figure 8:
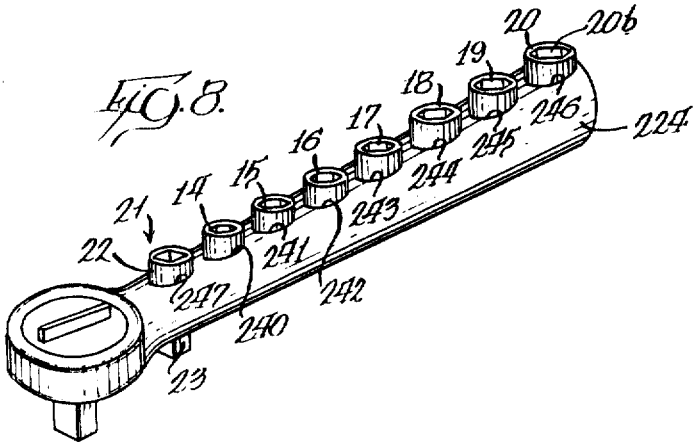
FIG. 8 is a perspective view similar to FIG. 2 illustrating a third embodiment of the invention.

Referring now to FIG. 8, the third embodiment of the invention has a handle provided with an arcuate wall 224 which is much like the wall 24 of the first embodiment in that it defines a storage cavity with an entrance opening along one side and has holes the axes of which are along the longitudinal median line of the wall 224. In the third embodiment, the socket members 14 through 20 and the extension member 21 are stored with their respective axes of rotation effectively on the longitudinal median plane of the entrance opening, and the access holes 240 through 247 are of different sizes so that each is adapted to have a part of one of the members extending therethrough. As in the first and second embodiments, transverse webs (not shown) divide the storage cavity into separate compartments, each of which receives and frictionally grips one of the members 14 through 21. Thus, force may be applied to the projecting end of any one of the members 14 through 21 when it is desired to remove that member from the cavity through the entrance opening.

If desired, the wall 244 may be modified so that it is deeper, in which event the members 14 through 21 may be completely enclosed within the cavity, and in that case the unit is provided with access holes like the holes 40 through 47 of the first embodiment.

The foregoing detailed description is given for clearness of understanding only and no unnecessary limitations should be understood therefrom, as modifications will be obvious to those skilled in the art.

I claim:

1. In a socket wrench of the type which has a handle, a head at one end of the handle with a socket mounting stub, and a set of interchangeable socket members of different sizes which are adapted for individual selective mounting on said stub, the improvement comprising:

said handle has an arcuate longitudinal wall defining a cavity which has an entrance opening along one side;

said cavity has portions of different sizes each of which is adapted to frictionally, engage with one of the socket members of said set;

and said wall has an access opening operatively associated with each portion of the cavity permitting application of force to the socket member in said portion to remove it through said entrance opening.

2. The improvement of claim 1 in which the handle tapers substantially uniformly from a large outer end to a narrow neck portion adjacent the head.

3. The improvement of claim 1 which includes integral transverse webs between adjacent portions of the cavity defining compartments for the socket members.

4. The improvement of claim 1 in which the access openings are holes along the longitudinal median line of the wall.

5. The improvement of claim 4 in which the holes are laterally elongated, have rounded margins, and are large enough to accommodate the end of a finger for applying force to the socket member.

6. The improvement of claim 5 in which each portion of the cavity is adapted to receive and frictionally engage with a socket member which has its axis of rotation lengthwise of the handle.

7. The improvement of claim 4 in which each portion of the cavity is adapted to receive and frictionally engage with a socket member which has its axis of rotation substantially centered on the hole.

8. The improvement of claim 7 in which each hole is adapted to have an end portion of a socket member projecting through it for application of force to the socket member.

9. The improvement of claim 1 in which said access opening is in the form of an arcuate recess at each margin of the wall, so that force may be applied to a socket member by gripping it between the fingers.

10. The improvement of claim 1 in which the cavity includes a neck portion immediately adjacent the socket head which is constructed to frictionally engage with an extension member which has one end portion that seats on the stub and a second end portion comprising a stub to selectively receive the socket members.

11. The improvement of claim 10 in which the handle tapers substantially uniformly from a large outer end to said neck portion.

12. The improvement of claim 11 in which each portion of the cavity is adapted to receive and frictionally engage with a member which has its axis of rotation lengthwise of the handle.

13. The improvement of claim 11 in which each portion of the cavity is adapted to receive and frictionally engage with a member which has its axis of rotation effectively on the longitudinal median plane of the entrance opening.

14. The improvement of claim 10 which includes integral transverse webs between adjacent portions of the cavity defining compartments for the members.

15. The improvement of claim 10 which includes resilient means secured to the wall in each portion of the cavity for frictionally gripping the members.

16. The improvement of claim 1 which includes resilient means secured to the wall in each portion of the cavity for frictionally gripping the socket members.

17. The improvement of claim 16 in which the longitudinal cavity wall in cross section is a segment of a circle in excess of 180°, and the resilient means is close enough to the longitudinal margins of the wall that the stored socket members have their transverse diameters positioned inwardly of the resilient means.

18. The improvement of claim 1 in which the cavity wall in cross section is a segment of a circle in excess of 180°, and in which the stored socket members are frictionally gripped between their transverse diameters and the longitudinal margins of said wall so they snap into the cavity.

19. The improvement of claim 1 in which each portion of the cavity is adapted to receive and frictionally engage with a socket member which has its axis of rotation lengthwise of the handle.

20. The improvement of claim 1 in which each portion of the cavity is adapted to receive and frictionally engage with a socket member which has its axis of rotation effectively on the longitudinal median plane of the entrance opening.

21. Socket member storage means for interchangeable sockets of a socket wrench of the type which has a head with a socket mounting stub, said storage means comprising:

an arcuate longitudinal wall defining a cavity which has an entrance opening along one side, said cavity having several distinct portions each of which receives and frictionally engages with one socket member of a set, and an access opening in the wall operatively associated with each portion of the cavity for applying manual force to the socket member in said portion to remove said socket member through the entrance opening.

22. The [improvement] *storage means* of claim 21 which includes integral transverse webs between adjacent portions of the cavity defining compartments for the socket members.

23. The [improvement] *storage means* of claim 21 in which the access openings are holes along the longitudinal median line of the wall.

24. The [improvement] *storage means* of claim 21 in which each portion of the cavity is adapted to receive and frictionally engage with a socket member which has its axis of rotation lengthwise of the handle.

25. The [combination] *storage means* of claims 21, 22, 23 or 24 in which the socket member storage means [is integrally connected] *connects* to the head [and provides] *to provide* a handle for the wrench.

*26. Socket member storage means for a set of interchangeable sockets for a socket wrench of the type which has a head with a socket mounting stub, said storage means comprising:*

*a longitudinal wall defining a long, narrow cavity which has an entrance opening along one side, said cavity having several portions disposed therealong in tandem, each of which portions receives and separately retains one socket member of a set, and each portion of the cavity including means permitting the socket member in said portion to be removed therefrom through the entrance opening without disturbing any other socket member.*

*27. The storage means of claim 26 in which each portion of the cavity retains a socket member by frictional engagement therewith, and said means permitting the socket member in said portion to be removed therefrom comprises means permitting application of manual force to the socket to release it from said frictional engagement.*

*28. The storage means of claim 27 in which said means permitting application of manual force to the socket member comprises an access opening in the wall operatively associated with each portion of the cavity.*

*29. The storage means of claim 26 which includes transverse webs between adjacent portions of the cavity defining compartments for the socket members.*

*30. The storage means of claims 26, 27, 28 or 29 in which the storage means connects to the head to provide a handle for the wrench.*

* * * * *